(No Model.)
R. H. McMATH.
AUTOMATIC VALVE.
No. 536,477. Patented Mar. 26, 1895.
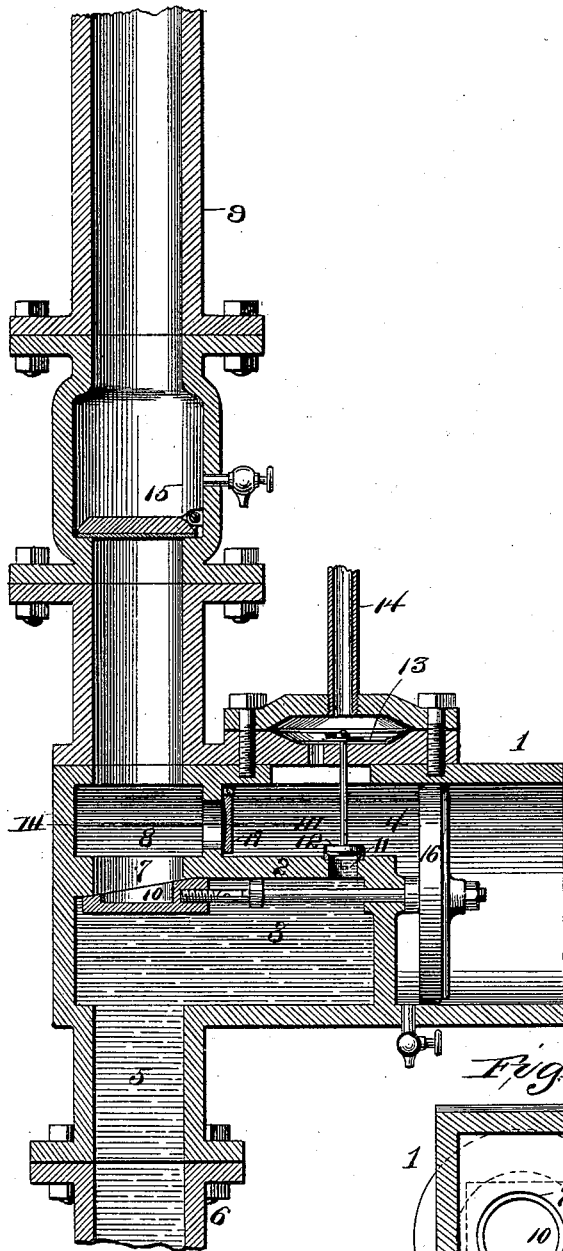
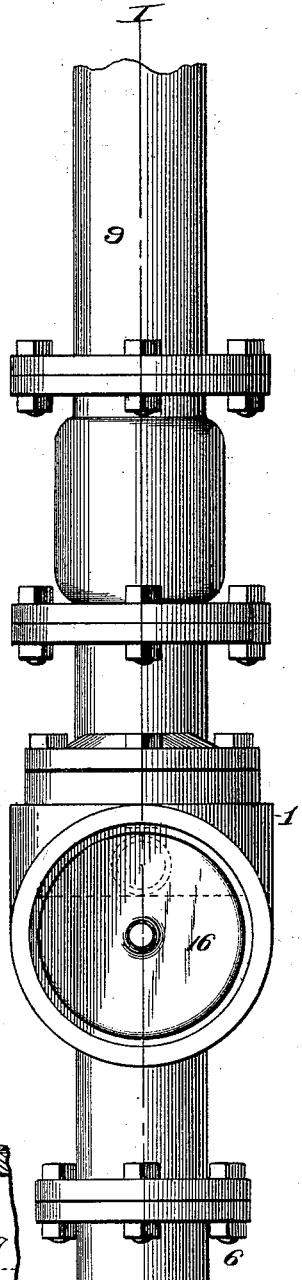
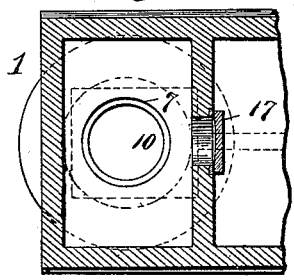
Attest
Charles E. Wise
C. A. Smith
Inventor:
Robert H. McMath
By Carr & Carr
Attys

UNITED STATES PATENT OFFICE.

ROBERT H. McMATH, OF ST. LOUIS, MISSOURI.

AUTOMATIC VALVE.

SPECIFICATION forming part of Letters Patent No. 536,477, dated March 26, 1895.

Application filed February 19, 1894. Serial No. 500,630. (No model.)

*To all whom it may concern:*

Be it known that I, ROBERT H. MCMATH, a citizen of the United States, residing in the city of St. Louis, State of Missouri, have invented a new and useful Automatic Valve, of which the following is a specification.

My invention relates to fire sprinkler systems and has for its principal object to minimize the obstructions to the flow of water and to insure that the valve when once opened automatically will remain open.

To these ends my invention consists in the valve and in the parts and arrangements of parts hereinafter described and claimed.

In the accompanying drawings which form part of this specification, Figure I is a cross section of my device on the line I—I of Fig. II. Fig. II is an elevation thereof; and Fig. III is a horizontal section on the line III—III of Fig. I.

A casing, 1, is divided by a partition, 2, into two main chambers, 3 and 4. The chamber, 3, is in direct communication through an opening, 5, therein with the water pipe, 6. A second opening, 7, in said chamber, 3, directly opposite said opening, 5, communicates either directly or preferably through an intermediate chamber, 8, as shown in the drawings with the house pipes, 9, of the system, the ends of which are closed by means of fusible plugs or otherwise. A slide valve, 10, is provided for closing said opening, 7. The partition, 2, also has an opening, 11, therein over which is a valve, 12, adapted to close the same. The stem of this valve, 12, is connected to a flexible diaphragm, 13, of spun copper or other suitable material, which diaphragm is located at the end of or otherwise in operative connection with an air pipe, 14. This air pipe, 14, contains air under pressure and is preferably connected with the pipes of the system above a valve, 15, which automatically opens to an upward pressure of the water. The stem of the slide valve, 10, is connected to a piston or plunger, 16, in the chamber, 4.

The operation of the device is a follows: The valve being inserted in the system between the house pipe and the water pressure pipe, the pressure of the more or less compressed air in the house pipes above the valve, 15, and in the air pipe connected therewith distends the diaphragm 13, and forces the valve, 12, connected thereto against its seat so as to close the opening, 11, between the water chamber, 3, and the normally empty chamber, 4. The slide valve, 10, normally closes the opening, 7, between the chambers, 3 and 4. Such is the normal positions of the several parts. Now, the air pressure being released in the house and air pipes by any means suitable for the purpose, the pressure of the water and the resiliency of the diaphragm or either of these raises the valve, 12, away from its seat, thereby establishing communication between the chambers, 3 and 4 through the opening 11. The water thereupon runs into chamber, 4, and its pressure moves the piston or plunger, 16, which carries with it the slide valve, 10. As soon as the slide valve, 10, is moved from its seat, a direct channel free from turns and other obstructions is established from the water pressure pipe to the house pipes the valve, 15, yielding automatically to the water.

It has happened with prior automatic fire extinguisher valves, which were brought into action by the removal of air pressure in the house pipes, that after the valve had operated, the water from the house pipes would fill the air pipes and re-establish the previous pressure or rather replace it with an equivalent pressure, which along with other circumstances would close the water valve and shut off the water at the very time it was needed. In order to insure against such an accident, the following provision is made: The chamber, 4, is connected with a chamber which is closed on one side by the diaphragm, 13, so that when the pipes are filled with water, the pressure on both sides of said diaphragm is about equal. Moreover, the chamber, 4, is connected to the house pipes below the valve, 15, or preferably with the chamber, 8, from which it is separated by a swinging gate, 17, adapted to be closed automatically by pressure of water through the opening, 11, but yielding to pressure in the chamber, 8, from the opening, 7. The opening, 11, is between the piston or plunger, 16, and the swinging gate, 17, and this part of the casing should be provided with a petcock or other means (not shown in the drawings) for drawing off any water that may leak through and accumulate therein. The effect of this arrangement is that the pressure on the two sides of the diaphragm is practically equal when the water fills the house pipes, and the valve, 12, will not be closed; but even if it should close by reason of excess of pressure in the air pipe, the pressure of water from the opening, 7, tends to keep the plunger or piston, 16, at the limit of its stroke. If some outside force is exerted against said plunger or piston, the swinging valve, 17, closes automatically and the force is directed against the diaphragm; so that if an outside force is strong enough to move back the plunger or piston at all, it at the same time lifts the valve, 12, off of its seat, thereby bringing the full pressure of water to bear against said piston or plunger, to reopen the valve. Another advantage of this arrangement is that the valve, 10, is opened as soon as the water from the opening, 11, fills the space between the piston or plunger and the swinging valve. Having once opened the valve, 10, the entire pressure is available for forcing the water through the direct channel to the house pipes.

In order to reduce friction, it is preferable to make the face and the seat of the slide valve inclined, as shown in the drawings, so that the valve is practically lifted slightly away from its seat when it first begins to move. In order to insure a tight closing of the slide valve, it is preferable to locate it inside of the water chamber, 3, so that the pressure of the water forces it against its seat. It is also preferable to have the slide valve connected to the piston or plunger rod by a flexible or pivotal connection so as to permit the valve to be seated tight. The several chambers can be made in a single casting and when a chamber, 8, is used, as I consider best, it should be cast integral with the chambers, 3, 4, and with its house pipe opening in line with the openings, 5, 7, in the chamber, 3, so as to give a direct channel for the water. I do not, however, wish to restrict myself to the details of construction herein specified.

The principal advantages of my device are that it insures a prompt and full opening of the water valve, it provides a direct, unobstructed channel for the water and provides against the accidental closing of the valve.

Having thus described my invention, I claim as new, and desire to secure by Letters Patent, the following:

1. A valve comprising a casing divided into two main chambers by a partition and communicating together by an opening in said partition, a valve for said opening connected to and operated by a flexible diaphragm, a piston in one of said chambers and a slide valve in the other chamber connected thereto and adapted to close an opening in the other chamber, said opening being located opposite the end of the water supply pipe and communicating with the house pipe, substantially as described, whereby a direct, unobstructed channel is provided, said first mentioned chamber being also connected to said house pipe, substantially as described.

2. A valve comprising a casing divided into two main chambers by a partition and communicating together by an opening in said partition, one of said chambers having two openings opposite each other connected respectively to the house pipes and the water supply pipe, a slide valve in said chamber adapted to close the first of said last mentioned openings, a valve connected to a flexible diaphragm operatively connected to an air pressure pipe and adapted to close the opening between the two main chambers, and a piston in the second of said chambers connected to said slide valve, the opening between the two main chambers being located between the piston and the slide valve, substantially as described.

3. A valve comprising a casing divided into two main chambers communicating together, one of said chambers having two openings therein connected respectively to the house pipes and the water supply pipe, a slide valve adapted to close the first of said openings, a valve connected to a flexible diaphragm operatively connected to an air pressure pipe, said valve being adapted to close the opening between the two main chambers, a piston in the second of said chambers connected to said slide valve, said second chamber being also connected to the house pipes by an opening furnished with a valve which closes automatically upon the application of a force from the interior of said chamber, substantially as described.

4. A valve comprising a casing divided into two main chambers communicating together by an opening, a valve for said opening connected to and operated by a flexible diaphragm, a piston in one of said chambers and a slide valve connected thereto, said slide valve being adapted to close an opening in the other chamber, said casing having also a third chamber connected to the house pipes and having openings into the two main chambers respectively, one of said openings being the one closed by the slide valve and the other of said openings being closed by a swinging gate adapted to close automatically upon the application of a force from the interior of said first mentioned chamber, said chamber being also connected to a chamber which is closed by said diaphragm, substantially as described.

5. A valve comprising a casing divided into three chambers each communicating with the other two by valve controlled openings and two of said chambers being connected to the water supply pipe and the house pipes respectively in line with the opening between themselves, a slide valve adapted to close the opening between said two chambers, a valve for the opening between the water chamber and the third chamber connected to a flexible diaphragm operatively connected to an air pressure pipe, a piston in said third chamber connected to said slide valve to operate the same, a gate for the opening between the second and third chambers which closes automatically upon the application of a force from the interior of said third chamber, a normally closed valve in the connection to the house pipes which opens automatically to an upward pressure, and a connection from the third chamber to a chamber closed by the flexible diaphragm, substantially as described.

ROBT. H. McMATH.

Witnesses:
JAMES J. O'DONOHOE,
JAMES A. CARR.